US011226253B2

(12) United States Patent
Broden et al.

(10) Patent No.: US 11,226,253 B2
(45) Date of Patent: Jan. 18, 2022

(54) HIGH RANGE DIFFERENTIAL PRESSURE SENSOR

(71) Applicant: Rosemount Inc., Shakopee, MN (US)

(72) Inventors: David Andrew Broden, Andover, MN (US); Charles Ray Willcox, Chanhassen, MN (US); Brian Michael Affias, Prior Lake, MN (US); Jennifer Ann Blodgett, St. Bonifacius, MN (US)

(73) Assignee: ROSEMOUNT INC., Shakopee, MN (US)

( * ) Notice: Subject to any disclaimer, the term of this patent is extended or adjusted under 35 U.S.C. 154(b) by 112 days.

(21) Appl. No.: 16/725,035

(22) Filed: Dec. 23, 2019

(65) Prior Publication Data
US 2021/0190619 A1 Jun. 24, 2021

(51) Int. Cl.
G01L 13/02 (2006.01)
G01L 9/00 (2006.01)
G01L 19/00 (2006.01)
G01L 19/14 (2006.01)

(52) U.S. Cl.
CPC .......... G01L 13/025 (2013.01); G01L 9/0072 (2013.01); G01L 19/0061 (2013.01); G01L 19/14 (2013.01)

(58) Field of Classification Search
None
See application file for complete search history.

(56) References Cited

U.S. PATENT DOCUMENTS

| 4,905,575 | A | 3/1990 | Knecht et al. |
|---|---|---|---|
| 5,224,383 | A | 7/1993 | Pinto et al. |
| 5,386,729 | A | 2/1995 | Reed et al. |
| 6,295,875 | B1 | 10/2001 | Frick et al. |
| 7,401,522 | B2 | 7/2008 | Broden et al. |
| 7,503,220 | B2 | 3/2009 | Sittler et al. |
| 9,316,553 | B2 | 4/2016 | Willcox |
| 9,857,259 | B2 | 1/2018 | Broden et al. |
| 2006/0236775 | A1 | 10/2006 | Mei |
| 2007/0227252 | A1 | 10/2007 | Leitko et al. |

FOREIGN PATENT DOCUMENTS

DE 102017109971 A1 11/2018

OTHER PUBLICATIONS

Notification of Transmittal of International Search Report and the Written Opinion of the International Searching Authority from International Application No. PCT/US2020/060726, dated Mar. 3, 2021.
"Electralloy Nitronic® 32 Austenitic Stainless Steel Alloy", dated Feb. 1, 2019, Retrieved from the Internet: URL http://www.electralloy.com/images/pdf/Product_Sheets/Electralloy/Nitronic_32.pdf, XP002802166, 2 pages.

Primary Examiner — Lisa M Caputo
Assistant Examiner — Nigel H Plumb
(74) Attorney, Agent, or Firm — Westman, Champlin & Koehler, P.A.

(57) ABSTRACT

A process pressure transmitter includes transmitter electronics disposed within a housing coupled to a pressure sensor formed by a cell body defining an interior cavity. A deflectable diaphragm separates the interior cavity into a first cavity and a second cavity. The deflectable diaphragm includes a groove region located around a periphery of the deflectable diaphragm.

19 Claims, 6 Drawing Sheets

HIGH RANGE DIFFERENTIAL PRESSURE SENSOR

BACKGROUND

The present invention relates to industrial process variable transmitters. More specifically, the present invention relates to industrial process variable transmitters of the type used to measure a differential pressure of a process fluid.

An industrial process transmitter is a transducer that responds to a measured variable with a sensing element and converts the variable to a standardized transmission signal, e.g., an electrical or radio frequency signal, that is a function of the measured variable. Industrial process pressure transmitters are used with the pressure measurement of an industrial process such as slurries, liquids, vapors and gasses in chemical, pulp, petroleum, gas, pharmaceutical, food, and other fluid processing plants. Industrial process transmitters are often placed near the process fluids, or in field applications. Often, these field applications are subject to harsh and varying environmental conditions that provide challenges for designers of such transmitters.

The sensing element (pressure sensor) in many pressure transmitters is a capacitance sensor that includes a deflectable sensing diaphragm ("diaphragm") and two capacitor electrodes. One type of sensing element includes a diaphragm, which is a conductive stretched membrane that deflects in response to pressures applied on both sides of the diaphragm, and two capacitor electrodes, one on each side of the diaphragm. A dielectric fill-fluid is used between the capacitor plates and the diaphragm. The fill fluid, used with an isolating diaphragm interfacing with the process fluid, prevents the process fluid, which at times can be harsh, corrosive, dirty or contaminated, from interacting with the components of the sensing element and perhaps damaging the components. A first capacitor electrode, on one side of the diaphragm, coupled with the conductive diaphragm forms a first capacitor. A second capacitor electrode, on the opposite side of the diaphragm, coupled with the diaphragm forms a second capacitor. The capacitance of each capacitor changes in proportion to the inverse of the distance between the capacitor plate and the diaphragm. Thus, the capacitance of each capacitor changes as the diaphragm deflects in response to the applied pressures. The amount of deflection is related to the difference between the two applied pressures, or differential pressure. The differential capacitance between each capacitor plate and the conductive diaphragm is detected and is used to provide the standardized transmission signal, which is related to differential pressure.

The sensing element is particularly adapted to detect diaphragm deflection in a process field environment. The approximate relationship between the capacitance, C, and the distance between one of the capacitor plates, X, is $C = \varepsilon K/X$, where $\varepsilon$ is the permittivity of the fill-fluid and K is a constant depending on several factors such as the geometry of the sensing element. The sensing element with two opposing capacitors is configured such that the output is generally independent of a varying permittivity. The two capacitors in the sensing element generally provide an output related to the ratio $(C_1 - C_2)/(C_1 + C_2)$, where $C_1$ is representative of the capacitance of the first capacitor and $C_2$ is representative of the capacitance of the second capacitor in the sensing element.

It is particularly challenging to provide accurate differential pressure measurements over a wide pressure range. This is because the pressure sensor must be sensitive enough to measure a small pressure change, yet robust enough to survive the application of large differential pressure. Specialized materials and alloys are employed in the construction of the pressure sensor in order to meet these requirements.

SUMMARY

A process pressure transmitter includes a transmitter electronics disposed within a housing. The transmitter electronics includes a communications circuit coupled to a processing system and an analog to digital converter disposed within the housing. The analog to digital converter electrically is coupled to the transmitter electronics. A pressure sensor comprises a cell body of a first material having a first interior wall and a second interior wall generally opposite the first interior wall defining an interior cavity. A deflectable diaphragm comprising a second/material is coupled to the cell body between the first and second interior walls and separates the interior cavity into a first cavity and a second cavity. The deflectable diaphragm includes a groove region located around a periphery of the deflectable diaphragm. The first and second cavities each contain a dielectric fill-fluid, each of the fill fluids adapted to receive a pressure and exert a corresponding force on the diaphragm, and the diaphragm is deflectable in response to differences in the pressures received by the fill-fluids in the first and second cavities. A first electrode is capacitively coupled to the conductive portion to form a first variable capacitor and a first lead wire electrically connects to the first electrode. A second electrode is capacitively coupled to the conductive portion of the diaphragm to form a second capacitor and a second lead wire is electrically coupled to the second electrode. The first and second lead wires are electrically coupled to the analog to digital converter.

DETAILED DESCRIPTION OF ILLUSTRATIVE EMBODIMENTS

Figure 1:
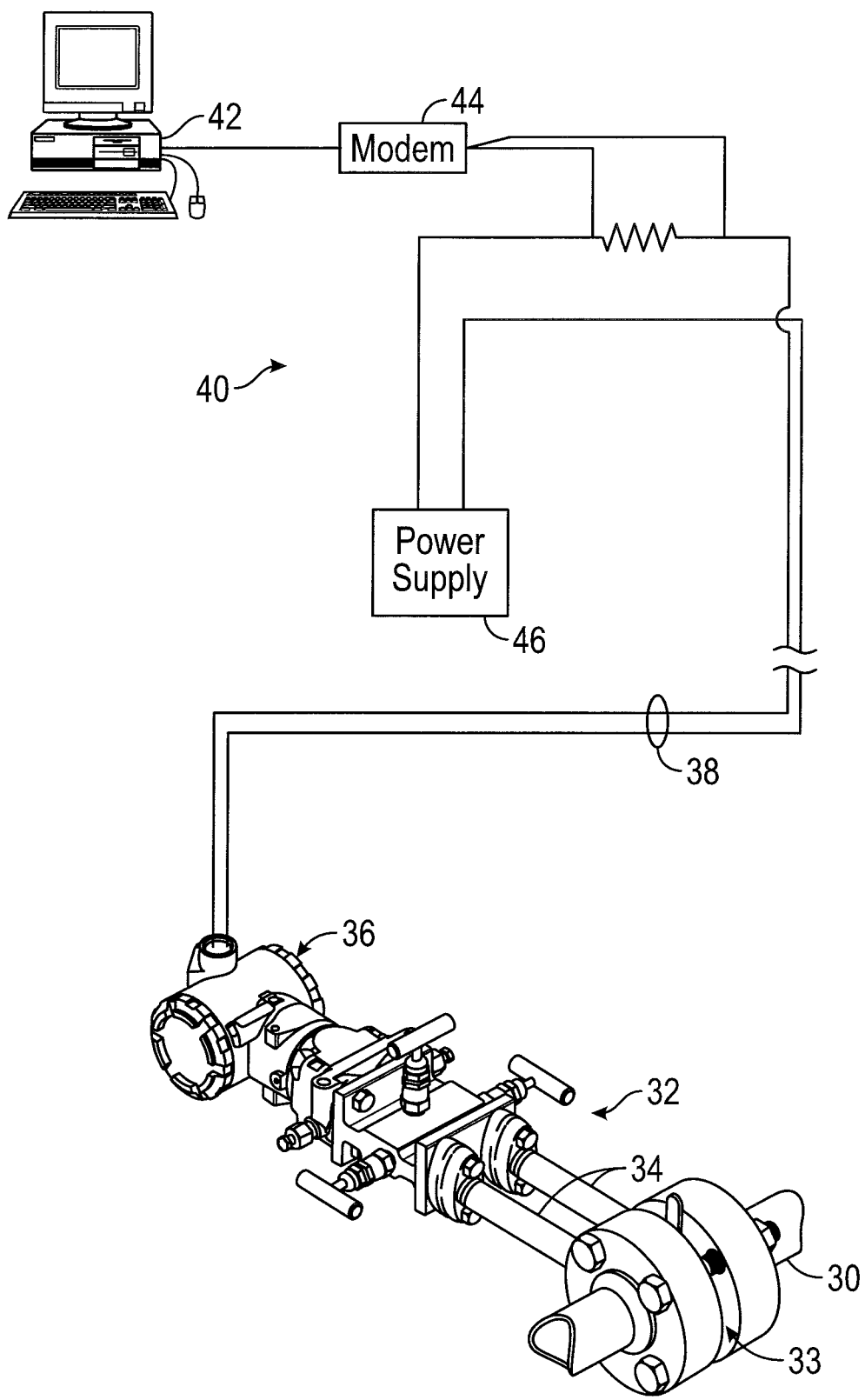
FIG. 1 shows a process measurement system with a process transmitter constructed in accordance with the present invention.

FIG. 1 shows generally the environment of a process measurement system 32. FIG. 1 shows process piping 30 containing a fluid under pressure coupled to the process measurement system 32 for measuring a process pressure. The process measurement system 32 includes impulse piping 34 connected to the piping 30. The impulse piping 34 is connected to a process pressure transmitter 36. A primary element 33, such as an orifice plate, venturi tube, flow nozzle, and so on, contacts the process fluid at a location in the process piping 30 between the pipes of the impulse piping 34. The primary element 33 causes a pressure change in the fluid as it passes past the primary element 33.

Transmitter 36 is a process measurement device that receives process pressures through the impulse piping 34. The transmitter 36 senses the process pressures and converts it to a standardized transmission signal that is a function of the process pressure. Transmitters can also sense multiple process variables or can be configured to provide process control functions. In the example, transmitter 36 is a differential pressure transmitter. Differential pressure is the difference in magnitude between two pressure values, e.g., the difference between two process pressures input to a transmitter. The measurement of differential pressure includes the measurement of gage pressure where the reference pressure input to the transmitter is atmospheric pressure, and also includes the measurement of absolute pressure where the reference pressure input to the transmitter is a vacuum. FIG. 1 shows the transmitter configured to measure flow. Other uses of the transmitter for differential pressure measurement, however, are contemplated.

A process loop 38 facilitates both a power signal to the transmitters 36 and bidirectional communication and can be constructed in accordance with a number of process communication protocols. In the illustrated example, the process loop 38 is a two-wire loop. A two-wire loop, as the name implies, uses only two wires to electrically connect the transmitter 36 to a remote control room 40. The two-wire loop is used to transmit all power to and all communications to and from the transmitter 36 during normal operations with a 4-20 mA signal. Accordingly, the transmitter 36 as illustrated often is referred to as a "two-wire transmitter," although other configurations, such as three-wire and four-wire transmitters, and so on, are known and contemplated. Communication can be performed with a 4-20 mA analog signal, and the open protocol HART®. (Highway Addressable Remote Transducer) digital communications format that provides simultaneous digital communications with the 4-20 mA signal. Communication can also be performed with open and interoperable protocol FOUNDATION™. Fieldbus that provides a digital communication link among intelligent field level and control devices. The transmitter 36 can be configured for use with other process protocols, including Device Bus, Sensor Bus, Profibus, ethernet, and others in use throughout the world. A computer 42 or other information handling system through modem 44, or other network interface, is used for communication with the transmitter 36. A remote voltage power supply 46 powers the transmitter 36. Transmitter 36 can be powered externally or internally, for example by a battery, solar cells, etc. Further, in some configurations, loop 38 is a wireless process control loop. For example, loop 38 can operate in accordance with IEC 62591 Wireless HART®.

Figure 2:
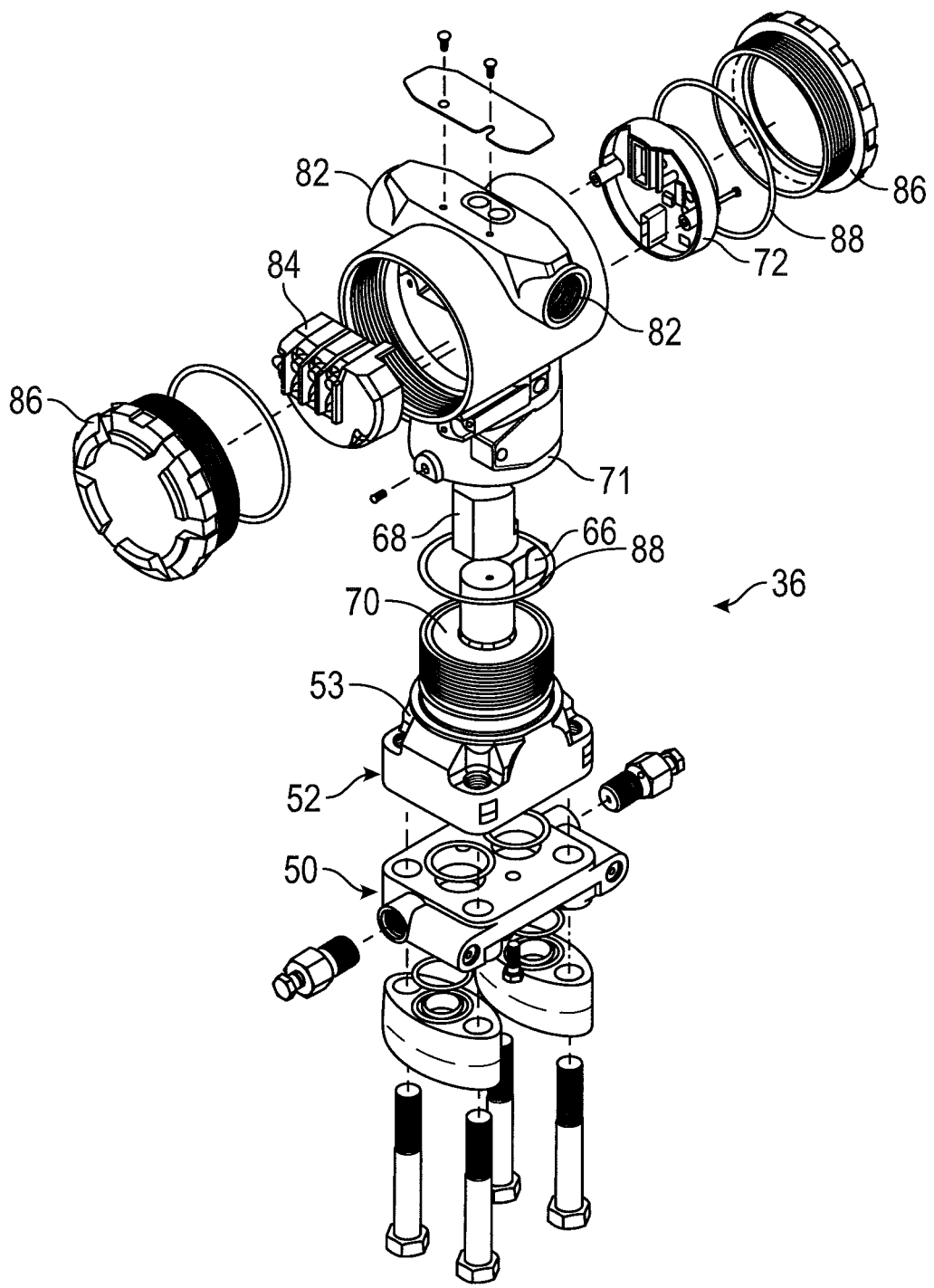
FIG. 2 is an exploded view of the process transmitter of FIG. 1.
Figure 3:
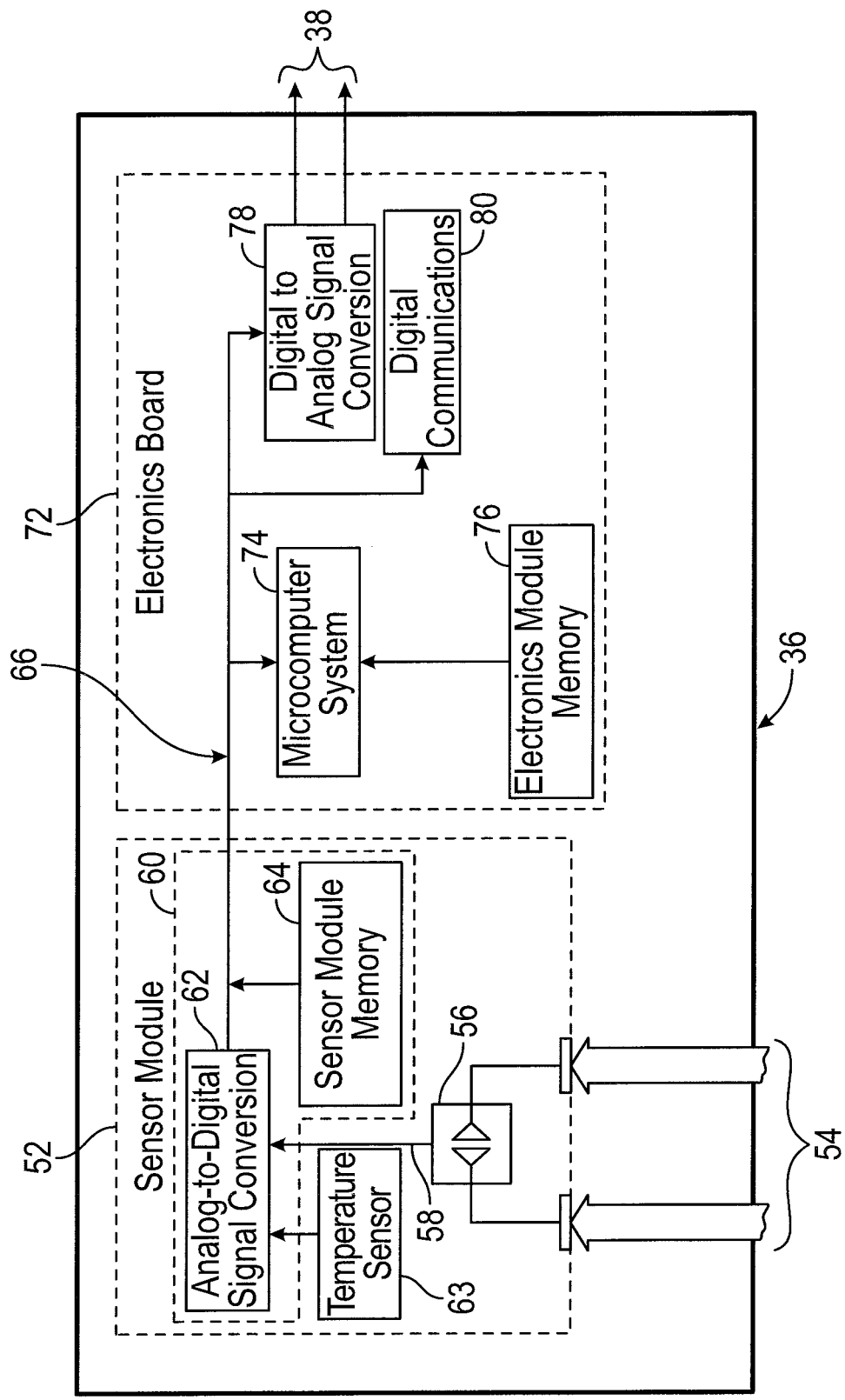
FIG. 3 shows a functional block diagram of the process transmitter shown in FIG. 1.

FIG. 2 shows an exploded view of the one example of transmitter 36. Flange 50 is attached to a sensor module 52 to interface with impulse piping 34. The sensor module 52 includes a threaded housing 53 that is an all welded design to isolate internal components from the process medium and the field environment. FIG. 3 shows a block diagram of transmitter 36 corresponding with FIG. 2. A process pressure 54 is applied to the sensor module 52. A pressure sensor 56, isolated mechanically, electrically, and thermally from the process medium receives the process pressures 54 and provides an analog electrical signal 58 representative of differential pressures. The signal 58 is processed and converted to a digital signal at sensor module electronics 60 that includes an analog to digital converter 62 and a sensor module memory 64. Memory 64 contains specific information about the sensor module and correction coefficients for the sensor module 52. A temperature sensor 63 provides an analog signal representative of ambient temperature to the sensor electronics 60. The digital signal is output over a multi-pin cable 66. As indicated in FIG. 2, the multi-pin cable 66 is implemented as a retractable tape enclosed by a cover 68 on the cap 70 of the sensor module 52.

Pursuant to one embodiment, an electronics housing 71 carries transmitter components that interface with the sensor module 52 and loop 38. The multi-pin cable 66 plugs into an electronics board 72. FIG. 3 shows that the electronics board includes a microprocessor system 74 and memory 76 that are used to further condition the digital signal. A digital to analog converter 78 or digital communication circuitry 80 is used to generate and receive either an analog or digital transmission signal over the loop 38 and is therefore often referred to as a "communication circuit." The loop 38 is connected to the transmitter through openings 82, as shown in FIG. 2. A terminal block 84 is electrically connected to the electronics board 72 to provide direct access to the generated signals. The electronics housing 71 receives the sensor module 52 and caps 86 with O-rings 88 to provide an explosion proof housing in an assembled transmitter 36 suitable for field installation. The housing protects the transmitter electronics that are within the sensor module 52 and the electronics housing 71.

Figure 4:
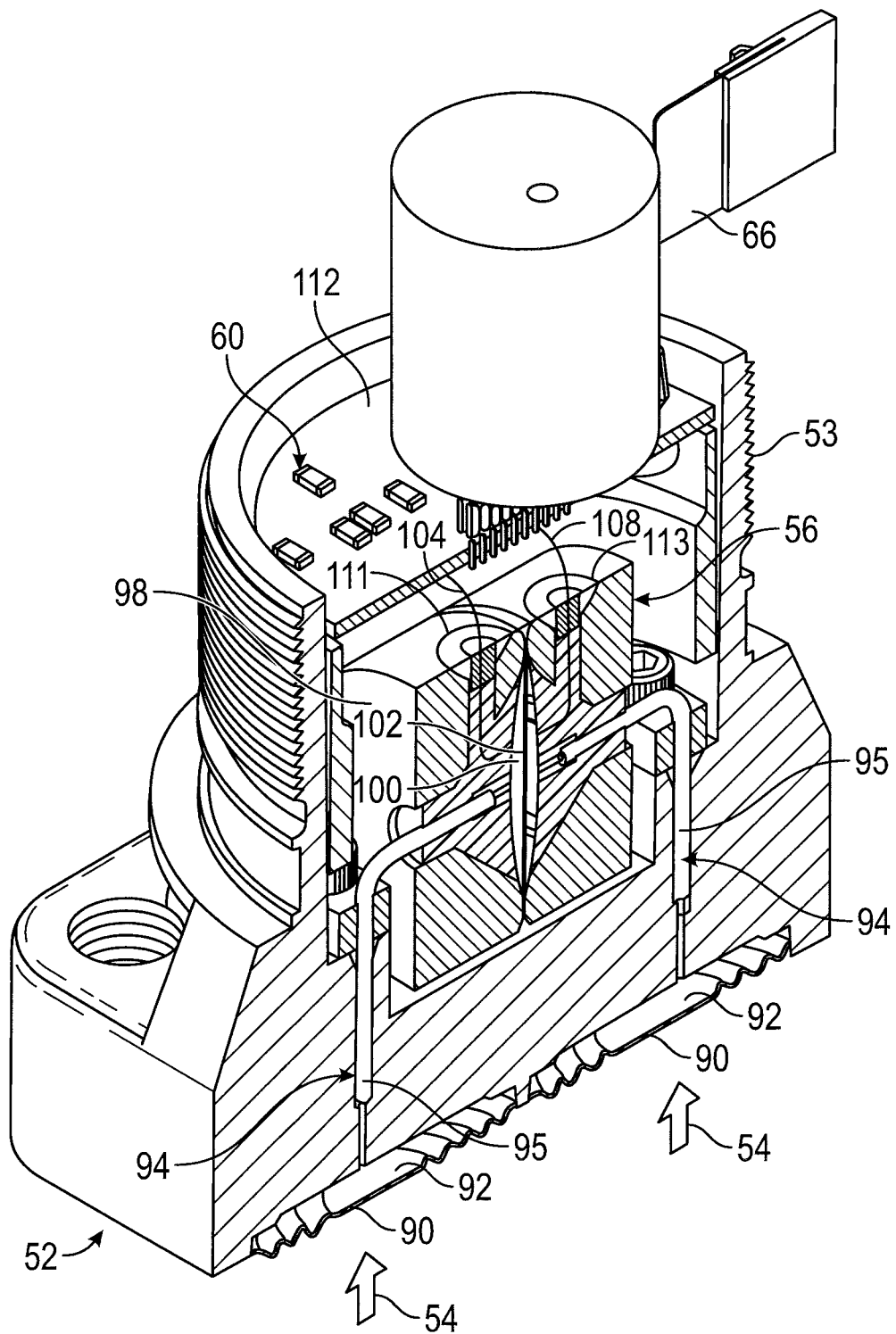
FIG. 4 is a perspective view of a sectioned sensor module and pressure sensor, which are portions of the transmitter of FIG. 1.

FIG. 4 shows a sectioned view of one embodiment of the sensor module 52. Differential process pressures 54, typically in the form of a fluid (gas or liquid) is applied to the sensor module 52 at isolation diaphragms 90. Each isolation diaphragm 90 deflects in response to the applied process pressures 54 within its isolation chamber 92. The isolation chambers 92 are in communication with isolation tubes 94 filled with a fill-fluid 95 that transfer the applied process pressures 54 to a sensor 56, which is also indicated schematically in FIG. 3 at reference number 56. The isolation diaphragms 90 serve to protect the sensor 56 from the process fluid, which can be corrosive or otherwise detrimental to the sensor 56. The sensor 56 includes a cell body 98 with an interior cavity 100 filled with the fill-fluid 95. A diaphragm 102, often referred to as a sensing diaphragm, separates the interior cavity 100 into two generally equal and opposite cavity halves, and deflects in response to the process pressure 54 as transferred into the interior cavity 100. The displacement of the deflected diaphragm 102 is proportional to the difference in pressure between the two halves of the cavity 100. The position of the diaphragm 102 with respect to the cavity 100 is detected with capacitor electrodes within the cavity 100. Lead wires 104, 108 extend through openings 111 and 113 and connect capacitor electrodes to a sensor electronics board 112, containing sensor electronics 60. Thus, the sensor 56 converts the differential process pressure into an analog electrical signal, and the sensor electronics 60 convert the analog electrical signal into a digital electrical signal.

As discussed in the Background section, differential pressure sensors which are used over a wide pressure range require specialized materials in order to improve their accuracy. However, the materials typically used in the manufacture of such sensors have several shortcomings. They experience measurable hysteresis under varying pressures (in comparison to lower range pressure sensors) which may lead to inaccuracies in process measurements. Further, the materials are relatively expensive and have limited availability. In order to address these limitations, a new sensor geometry is provided. Further, in, one aspect of the invention incorporates an Inconel center diaphragm and Nitronic cell halve cells. Inconel, or similar materials, display both high strength and excellent spring properties resulting in lower hysteresis when compared to the same diaphragm geometry fabricated out of traditional materials.

It is also desirable to provide a design that is compatible with current manufacturing processes. Both Inconel diaphragms and Nitronic halve cells are thermally compatible and laser weldable. Thermal expansion differences between the materials are sufficiently close. This results in sensors with easily correctable raw temperature performance characteristics. In other example configurations, the diaphragm and the halve cells are made from the same material. In a more specific example, they are both made from Inconel.

Figure 5A:
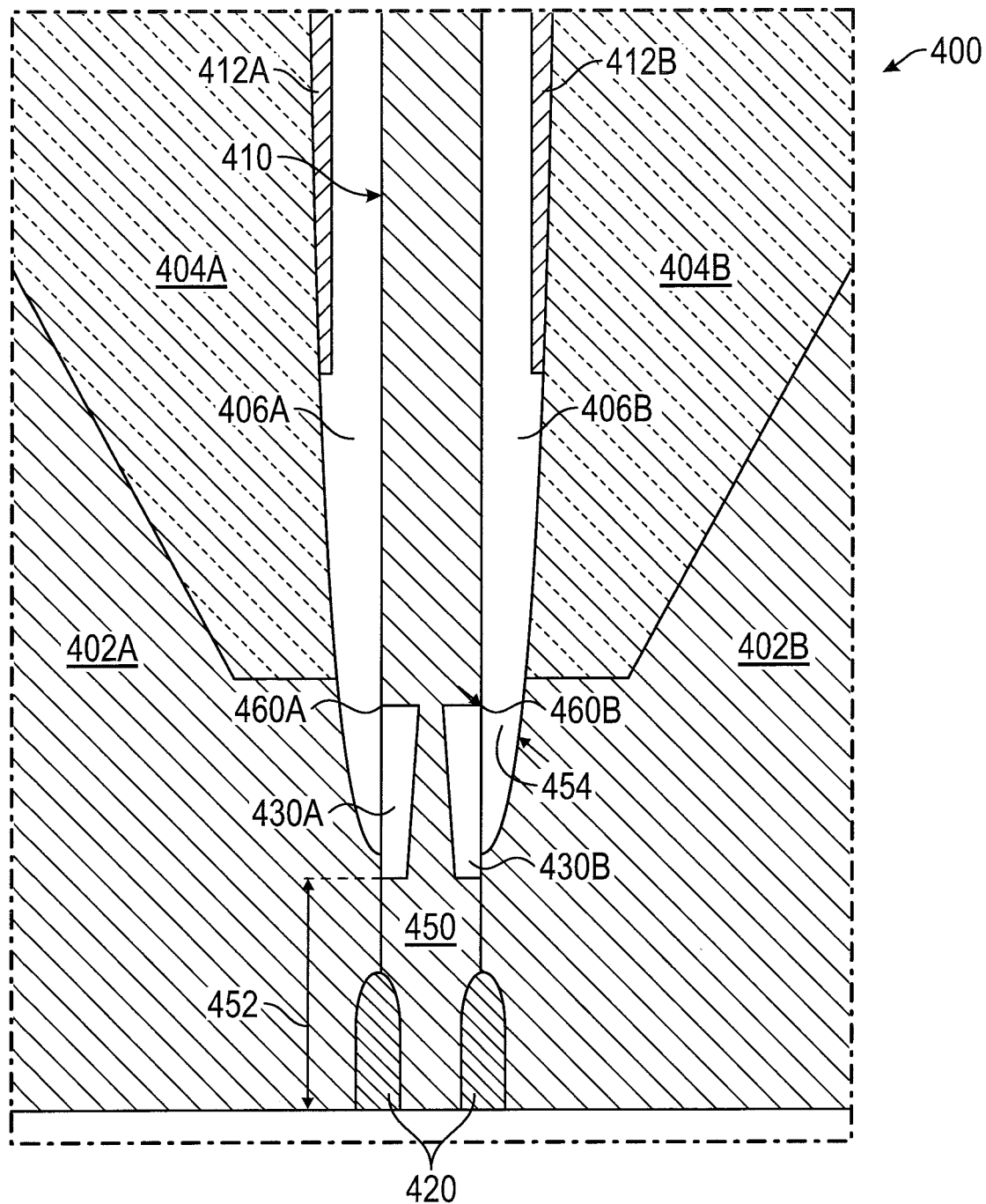
FIG. 5A is an enlarged cross-sectional view of a pressure sensor in accordance with one example embodiment configured to operate over a wide pressure range.
Figure 5B:
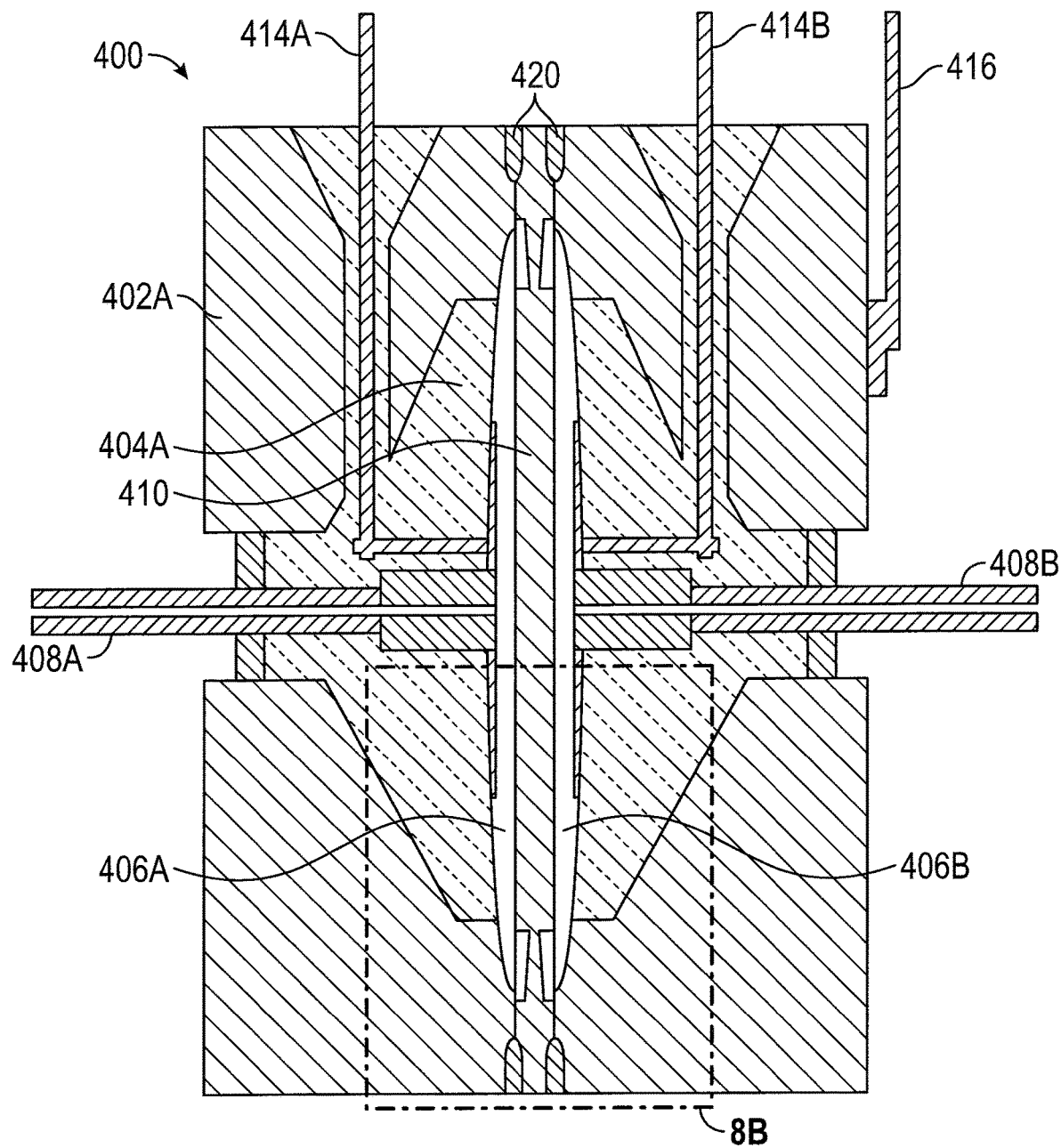
FIG. 5B is a side cross-sectional view of the pressure sensor of FIG. 5A.

FIG. 5A is an enlarged partial cross-sectional view and FIG. 5B is a cross-sectional view of a high range differential pressure sensor 400 in accordance with one example embodiment. Pressure sensor 400 includes two half-cell bodies 402A,B which are formed of Nitronic. A sensor diaphragm 410 of Inconel is suspended between the two half-cells 402A,B. Laser welds 420 are positioned around a circumferential edge of the two half-cells 402A,B and are used to secure the two half-cells 402A,B to the sensor diaphragm 410. The sensor diaphragm 410 is suspended in half-cell cavities 406A,B which are formed by fill material 404A,B carried in the half-cells 402A,B. Fill material 404A,B is typically an insulator such as glass and carries capacitive electrodes 412A,B. In one specific configuration, fill material 404A,B comprises compatible glass.

Groove regions 430A,B are formed around an outer circumference of the sensor diaphragm 410 within the half-cell cavities 406A,B. An outer circumference 450 defines a land area 452 which extends between the groove regions 430A,B and the outer circumference of the half-cells 402A,B.

FIG. 5A also illustrates a critical region 454 where deflection of the sensor diaphragm 410 could cause contact between the sensor diaphragm 410 and the cell half bodies 402A,B. The groove regions 430A,B prevent such contact during normal operation.

FIG. 5B is a cross-sectional view of the entire pressure sensor 400. As illustrated in FIG. 5B, pressure tubes 408A and 408B are used to apply a differential pressure between cavities 406A and 406B. FIG. 5A/5B also illustrates electrical connections 414A, 414B and 416 which are used as discussed in connection with sensors 200 and 300 above, to make electrical connections to capacitors 412A,B and the cell body 402A,402B The new geometry changes as shown in FIGS. 5A, 5B, and including an Inconel diaphragm results in a significant improvement in the cost and ease of manufacture of the sensor, as well as improving the sensor's hysteresis performance.

Although the specific examples set forth herein include the diaphragm 410 as being fabricated from Inconel 718 and the half-cells 402A,B fabricated from Nitronic 32, other types of Inconel and Nitronic may be employed. Similarly, alternative electrically insulating fill materials 404A,B may be used.

Although the present invention has been described with reference to preferred embodiments, workers skilled in the art will recognize that changes may be made in form and detail without departing from the spirit and scope of the invention. The configuration and materials also improve over pressure hysteresis. The configuration also reduces stress in the diaphragm which provides additional benefits such as increasing fatigue life.

What is claimed is:

1. A process pressure transmitter, comprising:
a transmitter electronics disposed within a housing;
a pressure sensor comprising:
    a cell body comprising a first material defining an interior cavity;
    a deflectable diaphragm comprising a solid piece formed of a second material having a conductive portion, the diaphragm coupled to the cell body and separating the interior cavity into a first cavity and a second cavity;
    wherein the first and second cavities each contain a dielectric fill-fluid, each of the fill fluids adapted to receive a pressure and exert a corresponding force on the diaphragm, and the diaphragm is deflectable in response to differences in the pressures received by the fill-fluids in the first and second cavities;
    a first electrode coupled to the cell body in the first cavity, the first electrode capacitively coupled to the diaphragm to form a first variable capacitor;
    a first lead wire electrically connected to the first electrode and extending from the cell body;
    a second electrode coupled to the cell body in the second cavity, the second electrode capacitively coupled to the conductive portion of the diaphragm to form a second capacitor, wherein the first and second variable capacitors have capacitance values which are related to applied pressure; and
    a second lead wire electrically coupled to the second electrode and extending from the cell body;
    wherein the first and second lead wires are electrically coupled to the transmitter electronics;
    wherein the deflectable diaphragm includes a groove region located around a periphery of the deflectable diaphragm and positioned in the interior cavity to provide clearance between the deflectable diaphragm and the cell body during deflection of the deflectable diaphragm.

2. The process pressure transmitter of claim 1 wherein the second material comprises Inconel alloy.

3. The process pressure transmitter of claim 2 wherein the Inconel alloy comprises Inconel 718 alloy.

4. The process pressure transmitter of claim 1 wherein the first material comprises Nitronic alloy.

5. The process pressure transmitter of claim 4 wherein the Nitronic alloy comprises Nitronic 32 alloy.

6. The process pressure transmitter of claim 1 wherein the first material comprises Nitronic 32 alloy and the second material comprises Inconel 718 alloy.

7. The process pressure transmitter of claim 1 wherein the cell body is formed from two half-cells.

8. The process pressure transmitter of claim 7 wherein the two half-cells are welded to the deflectable diaphragm.

9. The process pressure transmitter of claim 8 wherein a first weld couples a first half-cell to the deflectable diaphragm and a second weld couples a second half-cell to the deflectable diaphragm.

10. The process pressure transmitter of claim 9 wherein the first and second welds are located in a land area of the deflectable diaphragm.

11. The process pressure transmitter of claim 10 wherein the first and second welds extend partially into the land area.

12. The process pressure transmitter of claim 10 wherein the land area is configured to reduce distortion of the cell body during a welding process.

13. The process pressure transmitter of claim 1 including an opposed groove region on an opposite side of the groove region of the deflectable diaphragm.

14. The process pressure transmitter of claim 13 wherein the groove regions are tapered.

15. The process pressure transmitter of claim 14 wherein a thickness of the deflectable diaphragm is greater at an outer periphery of the groove regions in comparison to a thickness at an inner periphery of the groove regions.

16. The process pressure transmitter of claim 1 wherein the groove region provides additional clearance between the deflectable diaphragm and the cell body.

17. The process pressure transmitter of claim 1 wherein the groove region extends from an inner periphery of the deflectable diaphragm which is located in the interior cavity to an outer periphery which is located beyond the inner cavity.

18. The process pressure transmitter of claim 1 wherein the first and second materials are the same.

19. The process pressure transmitter of claim 1 wherein the first and second materials comprise Inconel.

* * * * *